United States Patent [19]

Notsu

[11] Patent Number: 5,289,892
[45] Date of Patent: Mar. 1, 1994

[54] STEERABLE TRAILER AND STEERING APPARATUS OF COMBINATION VEHICLE

[75] Inventor: Ikurou Notsu, Saitama, Japan
[73] Assignee: Nissan Diesel Motor Co., Ltd., Saitama, Japan
[21] Appl. No.: 764,304
[22] Filed: Sep. 24, 1991

[30] Foreign Application Priority Data

Sep. 26, 1990 [JP] Japan .............................. 2-99741[U]
Oct. 17, 1990 [JP] Japan .............................. 2-107914[U]

[51] Int. Cl.⁵ .......................................... B62D 5/08
[52] U.S. Cl. ................................. 180/132; 180/133; 60/384
[58] Field of Search ................ 180/132, 133, 141; 60/384, 421, 462

[56] References Cited

U.S. PATENT DOCUMENTS 4,553,390 11/1985 Liebert et al. .................. 180/132 X
4,798,256 1/1989 Fassbender ...................... 180/132 X

*Primary Examiner*—Joseph D. Pape
*Attorney, Agent, or Firm*—Beveridge, DeGrandi, Weilacher & Young

[57] ABSTRACT

A steerable trailer is described which includes a coupling detector for detecting a coupling angle, a trailer wheel steering angle detector for detecting a trailer wheel steering angle, and actuators for steering the trailer wheels. A controller is provided for calculating and memorizing a travel direction of a coupling point at a location in response to signals transmitted from each of the detectors. The controller transmits output signals to the actuators to align a travel direction of a rear end of a trailer with the memorized direction of the coupling point when the rear end of the trailer reaches the location. The controller calculates and memorizes the travel direction of the coupling point at plural, discrete locations along the path of travel of the trailer. The steerable trailer may be connected to a tractor to provide a vehicle.

19 Claims, 9 Drawing Sheets

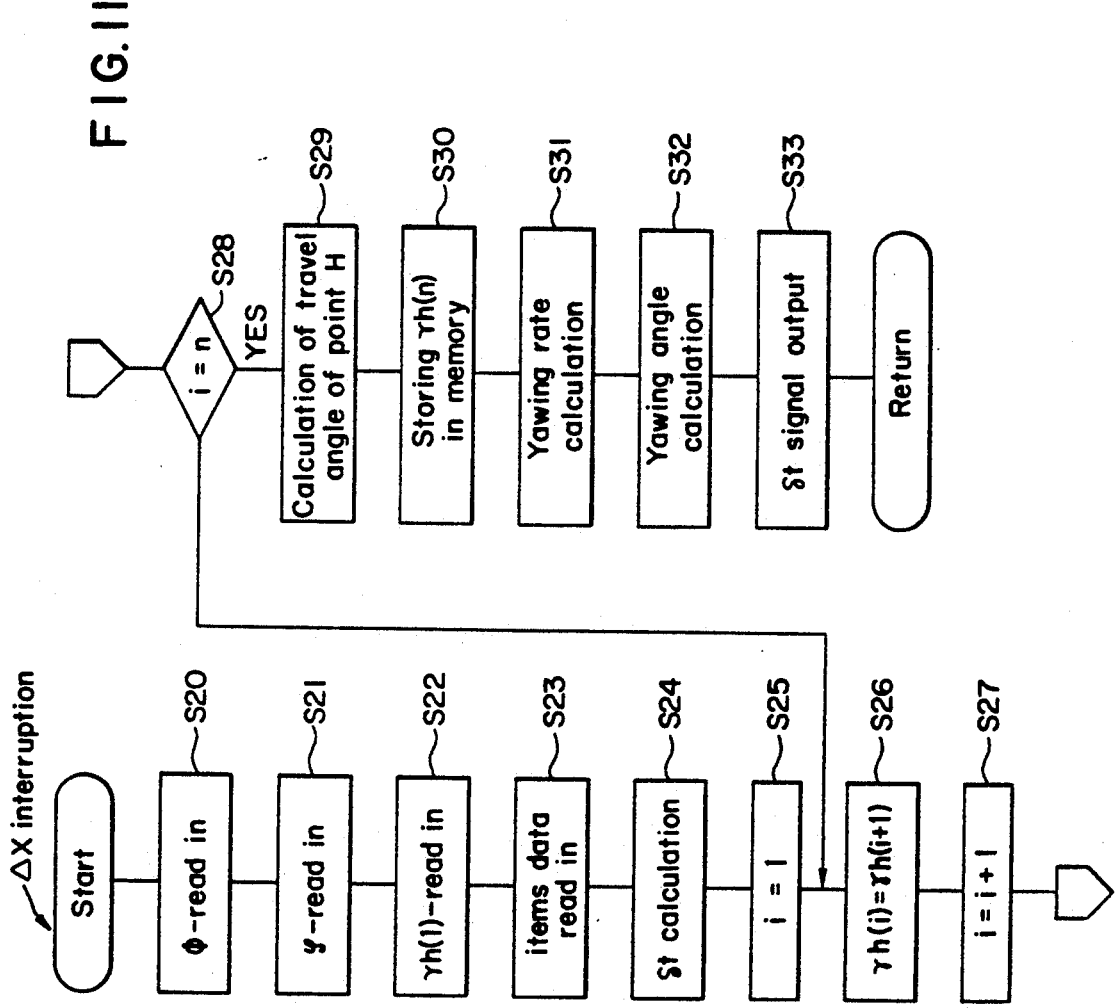

STEERABLE TRAILER AND STEERING APPARATUS OF COMBINATION VEHICLE

FIELD

The present invention relates to a semi-trailer with all wheels steerable.

Also, the present invention relates to a steering apparatus of a combination vehicle, that is, a semi-trailer.

PRIOR ART

As regards a steerable trailer, a full trailer is shown in the official gazette Japanese Patent Application Disclosure No. 61-60379. Also, a prior art of a semi-trailer is shown in the official gazette Japanese Patent Application Disclosure No. 56-163968. In the latter prior art, a steering mechanism of trailer wheels is controlled in response to output signals from a feedback circuit provided in a control circuit including a microcomputer which receives electric signals representing a steering status of the front wheel and a rotational status of the wheel as input signals. Also, in the latter art, a path of the trailer may approach that of the tractor so that a tractor and trailer can pass through a narrow curved path, and can prevent any obstacle from being caught under the wheels with the least inward turning.

In the above-mentioned prior art, since steering thereof is controlled with a feedback control and rear wheels thereof are non-steering wheels, it is difficult to make a path of the trailer align with that of the tractor. Therefore, it gives a low mobility.

As regards a steering apparatus of a combination vehicle, a steering apparatus of a full trailer is shown in the above-mentioned official gazette Japanese Patent Application Disclosure No. 61-60379. Also, a steering apparatus of a semi-trailer is shown in Japanese Utility Model Application No. 1-20202, which has been filed with the Japanese Patent Office in the name of the applicant.

The above-mentioned prior art is effective in itself. However, since the rear wheel steering angle is controlled so as to make a rear end of trailer follow (and/or trace) a path of the front end of the tractor, a complicated operation is required to control the steering angle. Also, since trailer items (distances between coupler and rear end, coupler and rear wheel set, and rear wheel set and rear end) are included in the operation expression, there is a nonconformity by which the trailers to be coupled are restricted.

SUMMARY

It is an object of the present invention to provide a combination vehicle which makes all of the path of the front end of the tractor, coupling point, and rear end of the trailer concur (align) with one another so as to improve a mobility thereof.

An other object of the present invention is to provide a steerable trailer due to a simple control and no restrictions on the tractor for a trailer to be coupled.

The present invention provides a combination vehicle comprising:
front wheel steering angle detecting means for detecting a front wheel steering angle;
coupling angle detecting means for detecting a coupling angle;
rear wheel steering angle detecting means for detecting a rear wheel steering angle;
trailer wheel steering angle detecting means for detecting a trailer wheel steering angle;
actuators for steering the rear wheels of the tractor and trailer, separately; and
control means for calculating and memorizing a travel direction of a front end of the tractor at voluntary points in response to signals transmitted from each of said detecting means, said control means transmitting output signals to each of said actuators so as to align travel directions of a coupling point and a rear end of the trailer with the memorized direction when the coupling point and the rear of the trailer reach a voluntary point.

It is preferable that the coupling angle detection means comprises a coupling angle sensor being attached to a coupler and detecting a relative angle between center lines of the tractor and trailer.

Also, It is preferable that the control means comprises a controller including a microcomputer.

In the combination vehicle being constructed as mentioned-above, at a voluntary point (represented by a point A), the controller calculates a travel direction on the front end of the tractor due to the front wheel steering angle being detected and memorizes the direction. Next, the controller calculates a rear wheel steering such that a travel direction of the coupling point (referred to as point B) is equal to the travel direction on the front end of the tractor when point B reaches a location of the point A, and then, the controller controls the rear wheel actuator.

Also, the controller calculates a trailer wheel steering angle such that a travel direction of the rear end (referred to as point C) of the trailer is equal to the above-mentioned travel direction when point C reaches a location of the point A, and then, the controller controls the trailer wheel actuator.

By the above-mentioned manner, steering angles of rear and trailer wheels are predicted, the rear wheel actuator and the trailer wheel actuator are controlled, and then, all of the paths of points A, B, and C concur (align) with one another.

According to the present invention, it is provided a steerable trailer comprising:
a steering mechanism for steering rear wheels; and
a controller for controlling the steering mechanism so that a rear end of the trailer may follow (and/or trace) a path of a coupling point.

Originally, a side slip angle should be considered in order to determine a travel direction of the coupling point. However, since a distance between the rear wheel set of a tractor and the coupling point is short, the sideslip angle can be considered as zero. Therefore, the controller can control the rear end of a trailer so as to make the rear end of the trailer follow (and/or trace) a path of the coupling point, due to a simple operation control calculation.

Embodiments of the present invention are explained hereinafter with reference to the accompanied drawings.

FIG. 9 is a control flow chart while the key switch is ON.

FIG. 11 is a control flow chart for calculating the rear wheel target steering angle.

EMBODIMENT

The first embodiment of the present invention is explained with reference to FIGS. 1-5.

Figure 1:
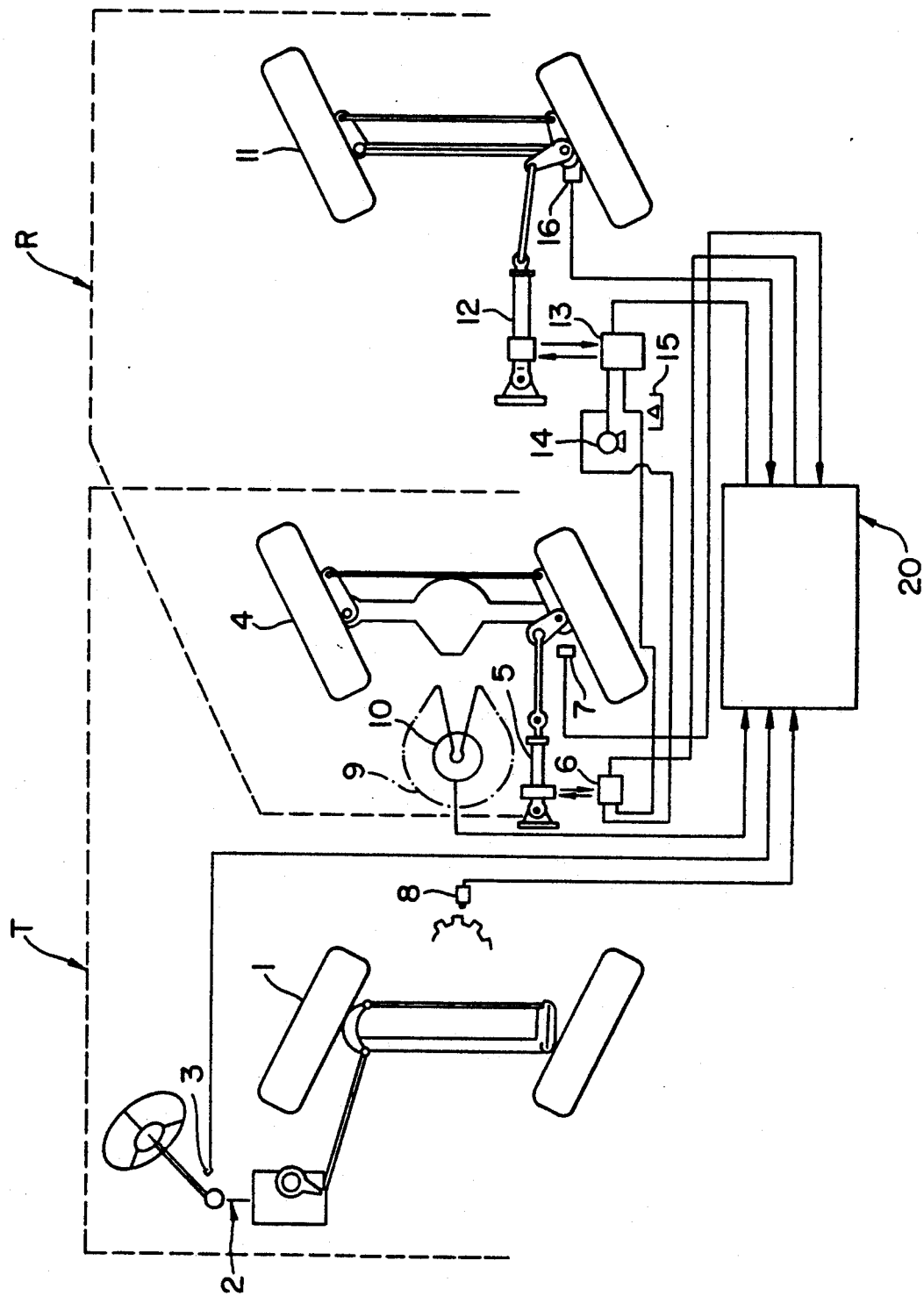
FIG. 1 is a general arrangement showing an embodiment of the present invention.

In FIG. 1, a steering mechanism 2 for steering a front wheel of a tractor T which includes a front wheel steering angle sensor 3 as a front wheel steering angle detection means. In a rear wheel 4, a rear wheel hydraulic cylinder 5 and rear wheel steering angle sensor 7 is provided as a rear wheel steering angle detection means. Also, a tractor T is provided with a vehicle speed sensor 8.

A coupler 9, which is a coupling point of tractor T and trailer R, is provided with a coupling angle sensor 10 for detecting a relative angle between center lines of tractor T and trailer R. The sensor 10 is provided as a coupling angle detection means.

Trailer wheel 11 is provided with a trailer wheel hydraulic cylinder 12 and a trailer wheel steering angle sensor 16 as a trailer wheel steering angle detection means. Actuators 5 and 12 are selectively connected with a hydraulic pump 14 or an oil tank 15 through servo valves 6 and 13, respectively. Also, sensors 3, 7, 8, 10, and 16, and servo valves 6 and 13 are connected with controller 20 individually.

Figure 2:
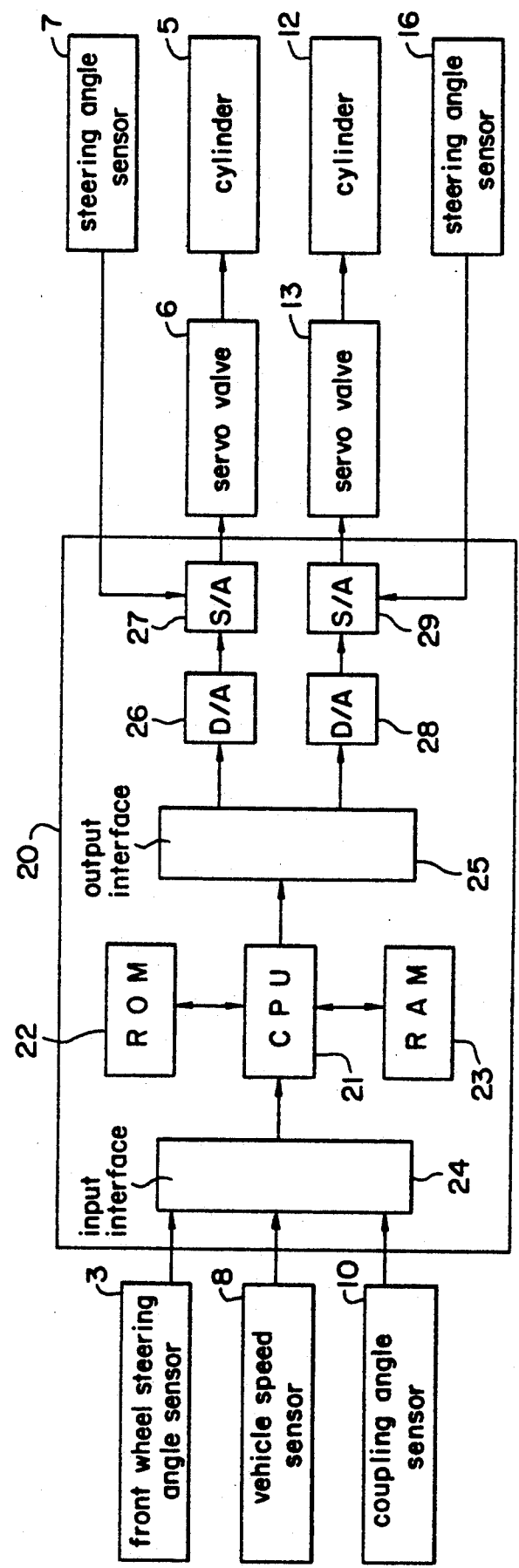
FIG. 2 is a control block diagram.

In FIG. 2, a controller 20, which comprises a circuit including a microcomputer, is provided with a central processing unit (CPU) 21. Through an input interface 24, the CPU 21 is connected with the front wheel steering angle sensor 3, vehicle speed sensor 8, and coupling angle sensor 10. Thus, signals from these sensors 3, 8, and 10 are input to CPU 21 through the input interface 24. Also, through output interface 25 being followed by D/A converters 26 and 28, a signal from CPU 21 is transmitted to a rear wheel servo amplifier 27 and trailer wheel servo amplifier 29, respectively. In addition to the CPU 21, controller 20 is provided with ROM 22 for memorizing programs and operation expressions, and RAM 23 for memorizing a travel direction of the front end of the tractor at a voluntary point, which direction is calculated by CPU 21. Through the servo valve 6, the above rear wheel servo amplifier 27 is connected with the rear wheel hydraulic cylinder 5, and also, the amplifier 27 is directly connected with rear wheel steering angle sensor 7. Similarly, through a servo valve 13, a trailer wheel servo amplifier 29 is connected with the trailer wheel hydraulic cylinder 12, and also, the amplifier 29 is directly connected with the trailer wheel steering angle sensor 16.

Figure 3:
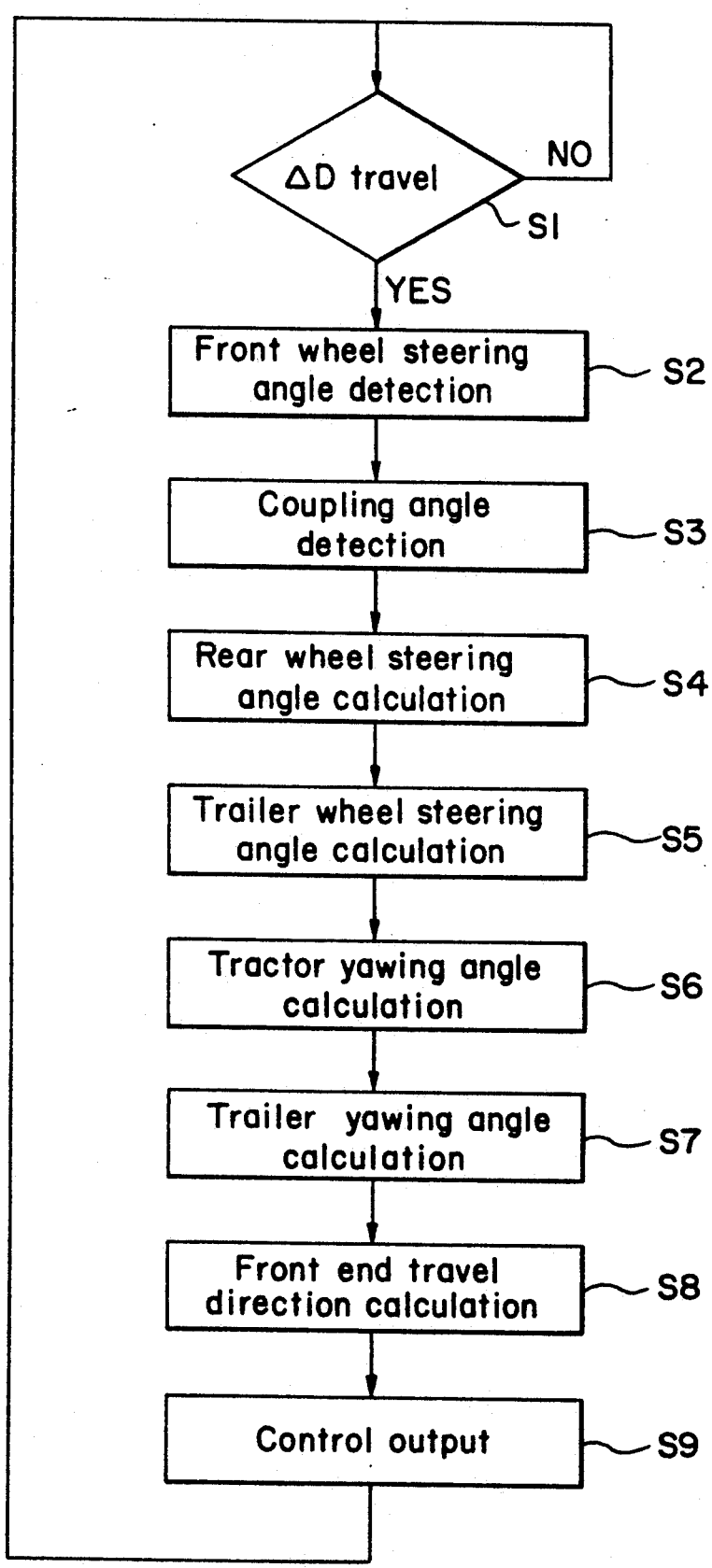
FIG. 3 is a control flow chart.
Figure 8:
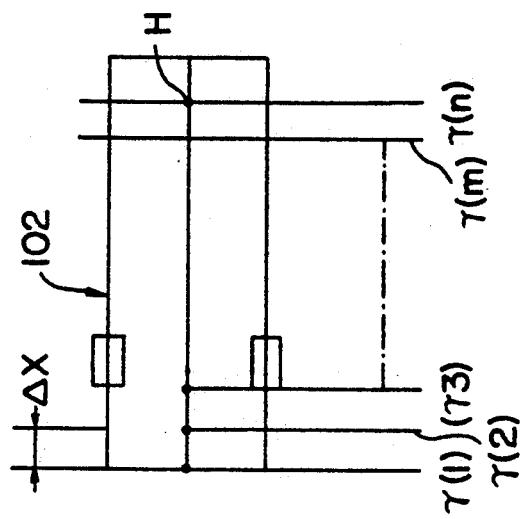
FIGS. 7 and 8 are plans for explaining the calculation modes.
Figure 4:
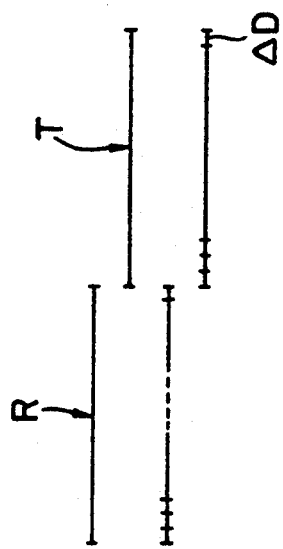
FIG. 4 is a drawing for explaining a unit distance.

Upon controlling, as shown in FIG. 3, with every travel of a prescribed unit distance D (shown in FIG. 4) being calculated due to signals from vehicle speed sensor 8 (step S1 is YES), controller 20 detects the front wheel steering angle and coupling angle (steps S2 and S3) due to signals from front wheel steering angle sensor 3 and coupling angle sensor 10. Then, the controller 20 calculates the rear wheel steering angle, trailer wheel steering angle, tractor yawing angle, and trailer yawing angle (steps S4, S5, S6, and S7). Next, the controller 20 calculates a travel direction of front end of the tractor T at a voluntary point (step 8). Due to this calculated result, controller 20 outputs control signals to the rear wheel hydraulic cylinder 5 and trailer wheel hydraulic cylinder 12, and then, controling procedure returns to step S1.

Hereinafter, a calculation mode is explained in reference to FIG. 5.

Figure 5:
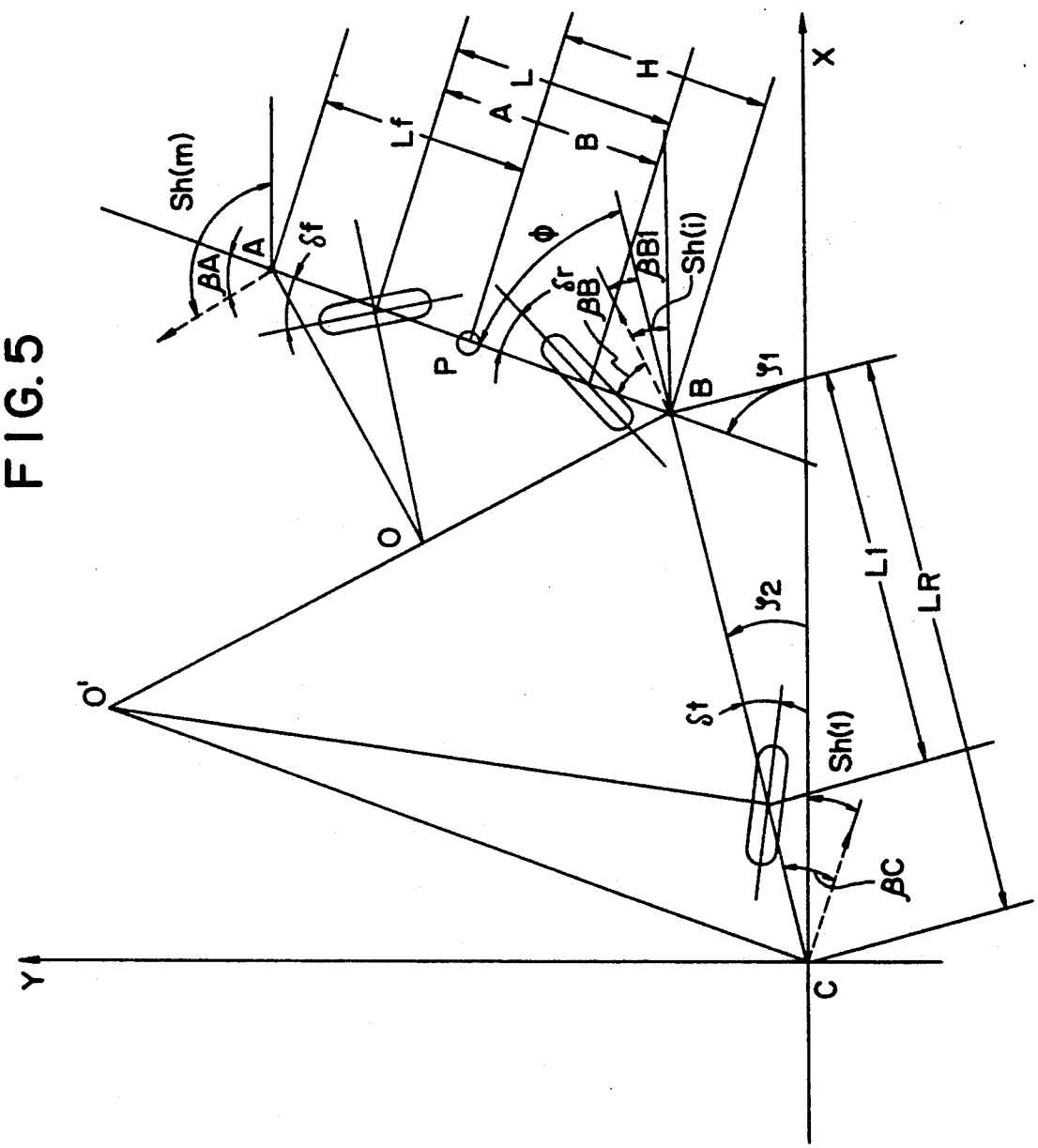
FIG. 5 is a drawing for explaining a calculation mode.

In FIG. 5, symbols A, B, C, and P denote a point of the front end of the tractor T, coupling point, point of the rear end of trailer R, and a center of gravity of wheel base L of tractor T, respectively. Also, symbols $\delta f$, $\delta r$, and $\delta t$ denote steering angles of the front wheel 1, rear wheel 4, and trailer wheel 11, respectively. Additionally, all of the angles are represented by radian.

Angle of sideslip $\beta A$ at point A is:

$$\beta A = \{(B+LF)/L\}\delta f + \{(A-Lf)/L\}\delta r.$$

Angle of sideslip $\beta B$ at coupling point B is:

$$\begin{aligned}\beta B &= Sh(i) - \psi_1 \\ &= \{(B-H)/L\}\delta f + \{(A+H)/L\}\delta r\end{aligned}$$

In this equation, $Sh(i)$ corresponds to a direction in which the coupling point B should be advanced.

Hence, a rear wheel steering angle $\delta r$, with which angle the coupling point B may advance in the direction of $Sh(i)$, is:

$$\delta r = \{L/(A+H)\}\{Sh(i)-\psi_1\} - \{(B-H)/(A+H)\}\delta f.$$

Angle of sideslip $\beta B_1$ of coupling point B, which angle $\beta B_1$ is viewed from trailer R, is:

$$\beta B_1 = Sh(i) - \psi_2.$$

A sideslip angle $\beta C$ of point C on the rear end is:

$$\beta C = Sh(1) - \psi_2.$$

In this equation, $Sh(1)$ corresponds to a direction in which point C should be advanced.

Also, $$\beta C = \{(L1-LR)/L1\}\beta B_1 + (LR/L1)\delta t.$$

Hence, a trailer wheel steering angle $\delta t$, with which the point C can advance in the direction of the yawing angle $Sh(1)$ is:

$$\delta t = (L1/LR)\{Sh(1)-\psi_2\} - \{(L1-LR)/LR\}\{Sh(i)-\psi_2\}.$$

Yawing rate $\psi_1$ of tractor T is:

$$\Psi_1 = (\Delta D/L)(\delta f - \delta r).$$

Vehicle angle in a unit time, that is, yawing angle $\psi_1$ is:

$$\psi_1 = \psi_1 + \Psi_1$$

Yawing rate $\Psi_2$ of trailer R is:

$$\Psi_2 = (\Delta D/L)(\beta B_1 - \delta t)$$

Yawing angle $\psi_2$ is:

$$\psi_2 = \psi_2 + \Psi_2$$

Also, assuming that coupling angle = $\phi$, we get:

$$\psi_2 = \psi_1 - \phi$$

As above-mentioned, the controller calculates Sh(n), which represents a travel direction of point A, due to the front wheel steering angle $\delta f$, and memorizes Sh(n) in RAM 23. Also, the controller calculates the rear wheel steering angle $\delta r$ so that the coupling point B may advance in the same direction, that is, the travel direction on the front end of the tractor when point B reaches a location of the point A. And then, the controller controls the rear wheel hydraulic actuator 5.

Additionally, the controller calculates the trailer wheel steering angle so that point C may advance in the same direction, that is, the travel direction on the front end of the tractor when point C reaches a location of the point A. And then, the controller controls trailer wheel hydraulic actuator 12.

Thus, a path of voluntary point A on the front end of the tractor, coupling point B, and point C on the rear end of the trailer will surely concur (align) with one another.

The second embodiment of the present invention is explained with reference to FIGS. 6–11.

Figure 6:
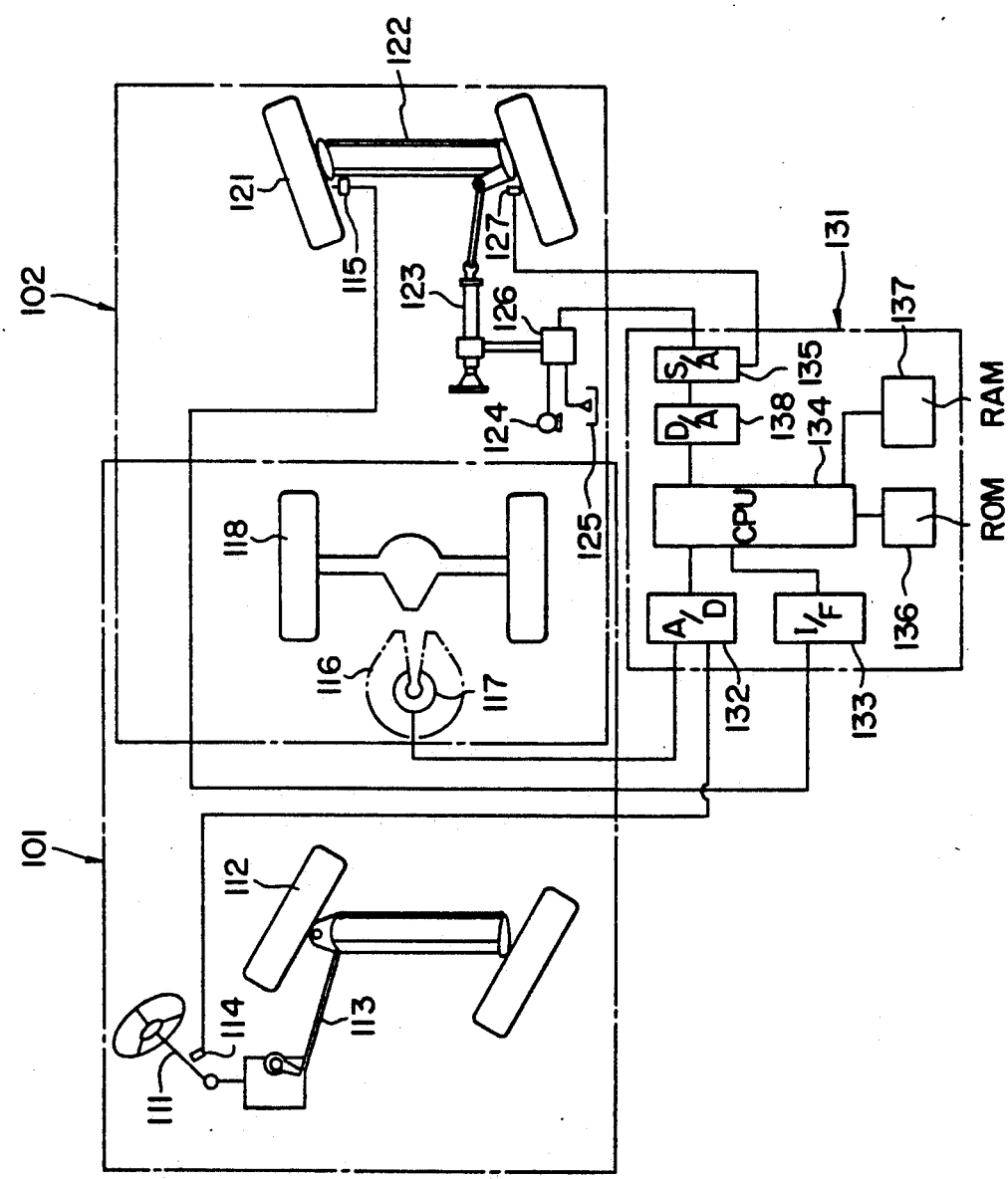
FIG. 6 is a general arrangement showing an embodiment of the present invention.

In FIG. 6, a tractor 101 is provided with a steering 111 and link mechanism 113 for steering a pair of front wheels 112 in combination with the steering 111. Also, the tractor 101 is provided with a front wheel steering angle sensor 114 for detecting a steered angle of front wheel 112 by measuring an angle of steering 111, and a coupling angle sensor 117 which is attached to a coupler 116 and detects a coupling angle of the coupler 116. And a numeral 118 denotes a pair of rear wheels of the tractor 101.

On the other hand, the trailer 102 is provided with a vehicle speed sensor 115 for outputting a pulse signal, a frequency of which signal is proportional to a number of revolutions of the rear wheel, link mechanism 122 for steering the rear wheel 121, and a hydraulic actuator 123 for driving the link mechanism 122. Through a servo valve 126, the actuator 123 is connected with an oil pump 124 and an oil tank 125. These members 122–126 construct the steering mechanism. Also, the trailer 102 is provided with a rear wheel steering angle sensor 127 for detecting a steering angle of rear wheel 121. These members 114, 115, 117, 126 and 127 are connected with a controller, respectively. The controller is represented by a numeral 131, in general.

The controller 131 consists of a microcomputer. A CPU 134 in the controller 131 is connected with a A/D converter 132, which is connected with the front wheel steering angle sensor 114 and the coupling angle sensor 117, and a pulse input interface 133 which is connected with vehicle speed sensor 115. Also, ROM 136 and RAM 137 are connected with the CPU 134, respectively. Through a D/A converter 138 and a servo amplifier 135, the CPU 134 is connected with the servo valve 126, and the servo amplifier 135 is connected with the rear wheel steering angle sensor 127.

Figure 7:
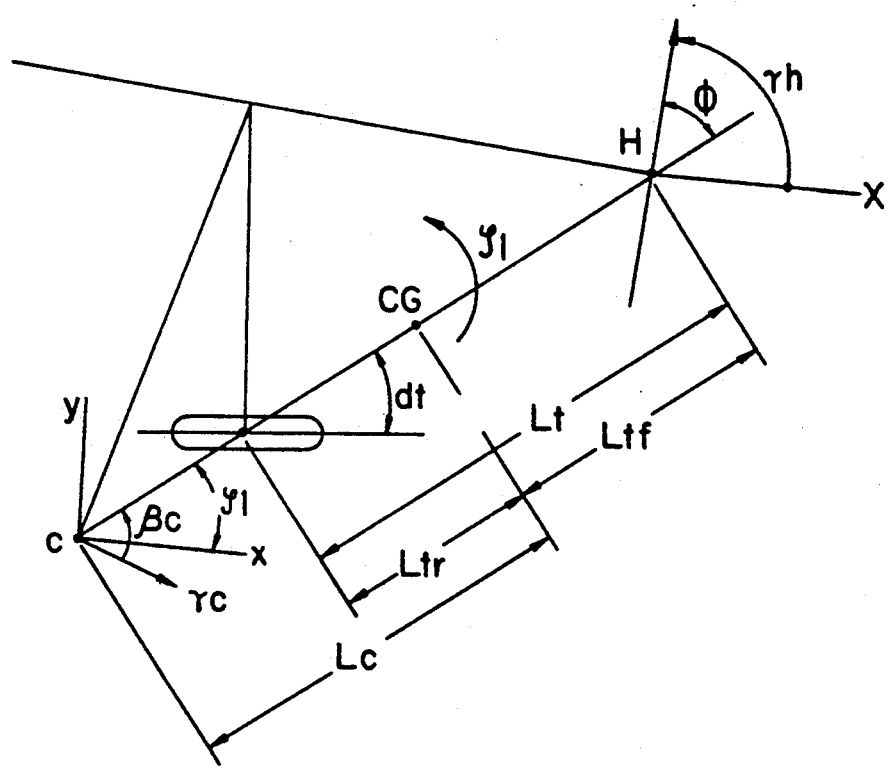

Next, a calculation mode is explained in FIG. 7.
In FIG. 7, assume that:
H: center of coupling point, that is, center of the coupler 116;
$\phi$: coupling angle;
C: rear end of the trailer 102;
C.G.: center of gravity of the trailer 102.

Then, a yawing rate $\Psi_1$ is:

$$\Psi_1 = (\phi - \delta t) V / Lt \quad (1).$$

A sideslip angle $\beta_1$ of center of gravity C.G. is:

$$\beta_1 = (Ltr \cdot \phi / Lt) + (Lft \cdot \delta t / Lt) \quad (2).$$

A sideslip angle $\beta c$ of point C is:

$$\beta c = \beta_1 - (Lc \cdot \omega_1 / V) \quad (3)$$

From equations (1) and (2), equation (3) is:

$$\beta c = \{(Ltr - Lc)\phi / Lt\} + \{(Ltf + Lc)\delta t / Lt\}.$$

Assuming that a character Lh denotes a distance between the rear wheel set of tractor 101 and the coupling point H, a sideslip angle $\beta h$ being viewed from the coupling point, that is, point H, is:

$$\beta h = (Lh/L) \cdot df + \phi$$

in which, a character L denotes a wheel base of the tractor 101. Since the distance Lh is so small as compared with the wheel base L, a value of "Lh/L" can be neglected, and therefore, we get:

$$\beta h \approx \phi \quad (4).$$

A travel direction $\gamma h$ of point H is:

$$\gamma h = \phi + \Psi_1 \quad (5).$$

Travel direction $\gamma c$ of point C is:

$$\gamma c = \beta c + \psi_1 \qquad (6)$$
$$= \{(Ltr - Lc)\phi / Lt\} + \{(Ltf + Lc)\delta t / Lt\} + \psi_1$$

If a discretion by a unit travel distance $\Delta x$ (FIG. 8) is carried out in order to make the point C follow and/or trace a path of the point H, $$\gamma c(x) = \gamma h(x - n \cdot \alpha x) \quad (7)$$

in which, $$n = (Ltf + Lc)/\Delta x \quad (8).$$

From the equations (5) and (6), we get:

$$\{(Ltr - Lc)\phi(x)/Lt\} + \{(Ltf + Lc)\delta t(x)/Lt\} + \Psi_1(x) = \gamma h(x - n \cdot \Delta x) \quad (9)$$

A yawing angle $\Psi_1(x)$ is represented as follows:

$$\Psi_1(x) = \Psi_1(x - n \cdot \Delta x) + \{(\phi(x) + \delta t(x))\Delta x / Lt\} \quad (10)$$

The equation (9) may also be transformed as follows:

$$\delta t(x) = \gamma h(x - n \cdot \Delta x) - \{(Ltr - Lc)\phi(x)/(Ltf + Lc)\} - Lt \cdot \phi(x)/(Ltf + Lc) \quad (11)$$

Thus, the controller operates and/or calculates a travel direction of the point H with every unit travel distance $\Delta x$ by the equation (5), and memorizes the travel direction in RAM 137. And then, the controller controls a target steering angle of rear wheel 121 of the trailer 102 by the equation (11), so as to make the point C move and/or pass in the same travel direction with the travel direction of the point H memorized in RAM 137 when the point C comes to a location that the point H has already passed.

Next, control modes are explained with reference to FIGS. 9-11.

Figure 9:
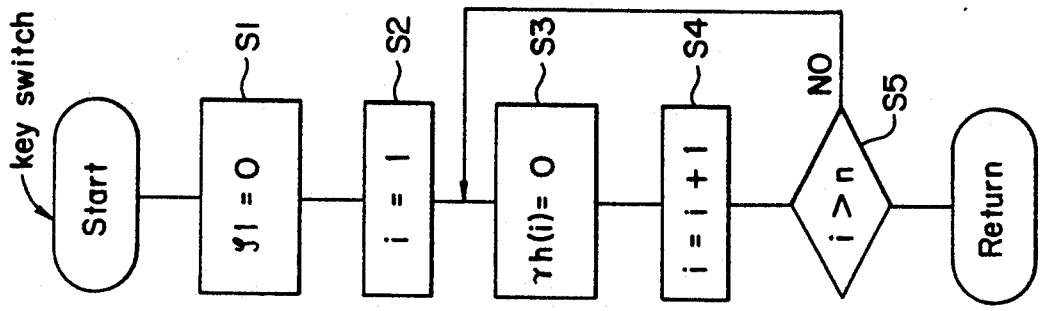

In FIG. 9, with a key switch (not shown) ON, the controller 131 resets the previously memorized yawing angle $\Psi_1$ to zero (step S1), and then, sets a counter of unit travel distance $\Delta x$ to 1 (step S2). Next, the controller sets the travel direction $\gamma h(i)$ to zero (step S3), and increases a value of the count by one (step S4). Then, when the value of the count reaches a predeterminded count n (step S5 is YES), the controller returns. In other words, while the power is ON, a target travel direction of the point C is kept in initialized condition that the point C moves in a straight advance direction until the point C reaches a location where the point H has passed.

Figure 10:
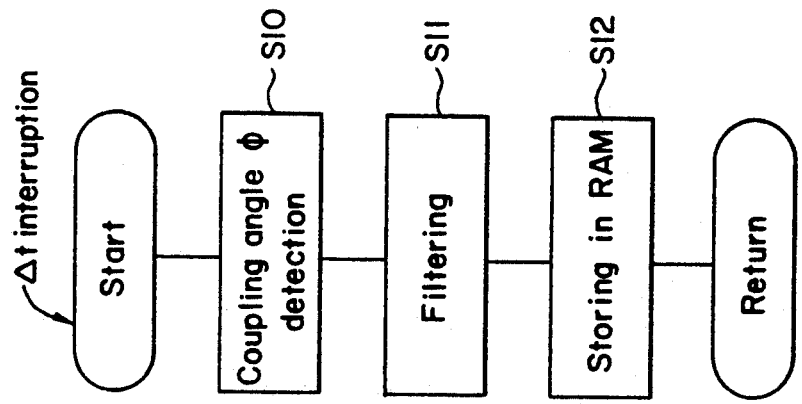
FIG. 10 is a control flow chart of detection and storage of coupling angle.

In FIG. 10, with every unit time $\Delta t$, due to signals generated from the coupling angle sensor 117, the controller 131 detects the coupling angle $\phi$ (step S10), eliminates noises (step S11), stores the coupling angle in RAM 137 (step S12), and returns.

In FIG. 11, with every travel distance $\Delta x$, the controller 131 reads the coupling angle $\phi$, the yawing angle $\psi$, the travel direction $\gamma h(1)$ of the point H at the time that the point H was at the present location of the point C, and items (weight and lengths Lc, Lfr, Ltf, Lt, etc.) of the trailer 102 (steps S20, S21, S22, and S23).

Then, the controller 131 calculates the target steering angle $\delta t$ of the rear wheel 121 with reference to the equation (11) (step S24), and sets the count of 1 (step S25). Then, controller 131 increases the data value of the travel direction $\gamma h(i)$ by one (step S26), increases the count value by one (step S27), and determines whether the count value has reached a predetermined count (value) n (step S28).

If No, the controller 131 returns to step S26.

If Yes, the controller 131 calculates a travel direction of the point H by the equation (5) (step S29), stores such the direction in RAM 137 (step S30). Then, the controller 131 calculates the yawing rate $\Psi_1$ by the equation (1) (step S31), calculates the yawing angle $\psi_1(x)$ by the equation (10) (step S32), outputs a signal of the target steering angle $\delta t$ to the servo amplifier 135 (step S32), and then, returns.

EFFECT OF THE INVENTION

The present invention, constructed as explained above, is able to control steering angles of rear wheel and trailer wheels by a feed forward control, make paths of any point on the front end of tractor, coupling point, and a point on the rear end of trailer concur (align) with one another, reduce inner wheel difference of the trailer, make a turn without overhang problems, and improve mobility thereof.

Also, since the present invention is constructed as mentioned above, the rear wheel of trailer can be steered with a simple control, and the mobility of the vehicle carring out the present invention is improved.

In addition, restrictions on trailers to be coupled can be removed.

I claim:

1. A steerable trailer, comprising:
coupling angle detecting means for detecting a coupling angle;
trailer wheel steering angle detecting means for detecting a trailer wheel steering angle;
actuators for steering trailer wheels; and
control means for calculating and memorizing a travel direction of a coupling point at a location in response to signals transmitted from each of said detecting means, said control transmitting output signals to said actuators so as to align a travel direction of a rear end of the trailer with the memorized direction of the coupling point when the rear end of the trailer reaches said location.

2. A steerable trailer according to claim 1, wherein the control means includes a microcomputer.

3. A steerable trailer according to claim 2, wherein the microcomputer includes an A/D converter.

4. A steerable trailer according to claim 2, wherein the microcomputer includes a CPU.

5. A steerable trailer according to claim 2, wherein the microcomputer includes a ROM.

6. A steerable trailer according to claim 2, wherein the microcomputer includes a RAM.

7. A vehicle, comprising:
a tractor provided with a steering mechanism and a link mechanism for steering a pair of front wheels;
a steerable trailer attached to the tractor, wherein the steerable trailer includes:
coupling angle detecting means for detecting a coupling angle;
trailer wheel steering angle detecting means for detecting a trailer wheel steering angle;
actuators for steering trailer wheels; and
control means for calculating and memorizing a travel direction of a coupling point at a location in response to signals transmitted from each of said coupling angle detecting means and said trailer wheel steering angle detecting means, said control means transmitting output signals to said actuators so as to align a travel direction of a rear end of the trailer with the memorized direction of the coupling point when the rear end of the trailer reaches said location.

8. A vehicle according to claim 7, further comprising a front wheel steering angle sensor for detecting a steering angle of the front wheels.

9. A vehicle according to claim 7, further comprising a pair of rear wheels provided on the tractor.

10. A vehicle according to claim 9, wherein a link mechanism is provided for steering the rear wheels.

11. A vehicle according to claim 9, further comprising a rear wheel angle sensor for detecting a steering angle of the rear wheels.

12. A vehicle according to claim 7, wherein the trailer further includes a vehicle speed sensor.

13. A vehicle according to claim 7, wherein the control means of the steerable trailer includes a microcomputer.

14. A steerable trailer according to claim 13, wherein the microcomputer includes an A/D converter.

15. A steerable trailer according to claim 13, wherein the microcomputer includes a CPU.

16. A steerable trailer according to claim 13, wherein the microcomputer includes a ROM.

17. A steerable trailer according to claim 13, wherein the microcomputer includes a RAM.

18. A steerable trailer according to claim 1, wherein the control means calculates and memorizes the travel direction of the coupling point at plural, discrete locations in response to signals transmitted from each of the detecting means, and the control means transmits output signals to the actuators so as to align the travel direction of the rear end of the trailer with the memorized direction of the coupling point when the rear end of the trailer reaches each of the discrete locations.

19. A vehicle according to claim 7, wherein the control means calculates and memorizes the travel direction of the coupling point at plural, discrete locations in response to signals transmitted from the coupling angle detecting means and the trailer wheel steering angle detecting means, and the control means transmits output signals to the actuators so as to align the travel direction of the rear end of the trailer with the memorized direction of the coupling point when the rear end of the trailer reaches each of the discrete locations.

* * * * *